United States Patent [19]

Wagner

[11] Patent Number: 4,714,091

[45] Date of Patent: Dec. 22, 1987

[54] MODULAR GAS HANDLING APPARATUS

[75] Inventor: Wilfried R. Wagner, Basking Ridge, N.J.

[73] Assignee: Emcore, Inc., South Plainfield, N.J.

[21] Appl. No.: 903,885

[22] Filed: Sep. 3, 1986

Related U.S. Application Data

[63] Continuation of Ser. No. 743,317, Jun. 10, 1985, abandoned.

[51] Int. Cl.[4] .................................... F16K 11/10
[52] U.S. Cl. ............................. 137/884; 137/271; 137/327; 137/561 R; 251/335.3; 285/412
[58] Field of Search .............. 137/271, 315, 327, 328, 137/884, 334, 561 R; 251/335 B; 285/211, 212, 412, DIG. 18

[56] References Cited

U.S. PATENT DOCUMENTS

| | | | |
|---|---|---|---|
| 2,272,861 | 2/1942 | Yahpe | 285/412 |
| 2,282,641 | 5/1942 | Corey | 285/DIG. 18 X |
| 2,669,467 | 2/1954 | Wolferz | 285/412 X |
| 3,234,964 | 2/1966 | Tusley et al. | 137/884 |
| 3,266,505 | 8/1966 | Kron | 251/159 X |
| 3,326,512 | 6/1967 | Clarke | 251/335 B X |
| 3,368,818 | 2/1968 | Asahaki et al. | 285/DIG. 18 X |
| 4,082,108 | 4/1978 | Dininio | 137/884 X |
| 4,257,439 | 3/1981 | Mayeaux | 137/606 X |
| 4,283,041 | 8/1981 | Kiyawski | 251/335 B X |
| 4,306,587 | 12/1981 | Tchebingayeff | 137/606 |
| 4,530,486 | 7/1985 | Rusnak | 137/561 R X |
| 4,558,845 | 12/1985 | Hunkapiller | 137/606 X |
| 4,609,074 | 9/1986 | Berrend | 137/884 X |

*Primary Examiner*—A. Michael Chambers
*Assistant Examiner*—John C. Fox
*Attorney, Agent, or Firm*—Lerner, David, Littenberg, Krumholz & Mentlik

[57] ABSTRACT

Apparatus for handling gaseous streams comprising modular flow block means, including a plurality of gas flow paths extending through said modular flow block means so as to provide a plurality of port members on respective surfaces of said modular flow block means, a plurality of valve passages extending into said modular flow block means so as to intercept said gas flow paths at predetermined locations throughout said modular flow block means, each of said plurality of valve passages including an entrance aperture on a respective surface of said modular flow block means, a plurality of valve flange members, each of said valve flange members being adapted to mount a high vacuum valve on said modular flow block means at one of said entrance apertures without the need to apply rotational force to said valve flange members, so as to removably, hermetically seal said high vacuum valve onto said modular flow block means, and each of said plurality of port members including port member mounting means whereby conduits can be removably, hermetically sealed to said respective plurality of port members.

38 Claims, 16 Drawing Figures

MODULAR GAS HANDLING APPARATUS

This is a continuation, of application Ser. No. 743,317 filed 6/10/85 now abandoned.

FIELD OF THE INVENTION

The present invention relates to modular gas handling apparatus. More particularly, the present invention relates to modular flow blocks including various flow paths extending therethrough. Still more particularly the present invention relates to modular gas flow blocks which can be interconnected and to which valves can be applied for the handling of various gases. Still more particularly, the present invention relates to modular gas handling apparatus for the facilitation of handling corrosive and/or expensive gases, particularly those used in connection wiht the production of semiconductor devices.

BACKGROUND OF THE INVENTION

Various manifolding systems for handing various fluids, both gases and liquids, have been known for many years. In particular, the mounting of a number of fluid handling valves on unitary blocks of steel or other suitable materials have been known for years. In such systems the valves are generally mounted so as to intercede in various flow paths extending through the blocks so as to be useful in alternately opening and closing those paths. Additionally, the modularization of these systems and interconnection between various modules has also been known.

In particular, one such type of system is shown in Tinsley et al, U.S. Pat. No. 3,234,964, which shows a manifold for distributing a gas under pressure. One of the blocks in the manifold system shown in Tinsley et al includes seven valve seats to receive seven standard valves for gas distribution through various outlet ports therein. Several of these valves are used in Tinsley et al for the measurement of gas pressure in various gas lines and for the measurement of gas flow rates therethrough.

U.S. Pat. No. 2,247,140 to Twyman discloses another multiple valve unit which has a housing which is compactly and directly connected to simialr valve units. In fact, the patentee himself states in this patent that the joining of the valve housings will eliminate considerable piping and form a directional control unit which is compact and convenient to operate. Similarly, Gray, U.S. Pat. No. 2,834,368, provides a valve fitting which in a single form can receive any of the various types of valves functionally necessary in hydraulic circuits. This is said to enable selected numbers of fittings to be arranged in juxtaposition into a unitary assembly so as to embody all of the selected valve functions of the system without requiring piping connections between the various valves.

Valve manifolds which are capable of receiving standard commercially available valves have also been disclosed, such as in Loveless, U.S. Pat. No. 3,244,193. Furthermore, the overall concept of modular valve blocks being used in such systems are shown in the following U.S. patents: Sartakoff, U.S. Pat. No. 1,797,591; Gray, U.S. Pat. No. 2,834,368; Beckett et al, U.S. Pat. No. 3,111,139; Barton, U.S. Pat. No. 3,158,164; Lyon, U.S. Pat. No. 3,234,963; Raymond, U.S. Pat. No. 3,589,387; Kiernan, U.S. Pat. No. 3,654,960; Jeans et al, U.S. Pat. No. 3,680,589; Murata, U.S. Pat. No. 3,766,943; and Stoneman et al, U.S. Pat. No. 3,806,088.

The search has continued, however, for such modular systems which can be applied to the specific application not only of handling gases but of handling gases under high vacuum conditions, furthermore, one which has a high degree of flexibility, and can be removably interconnected with additional modular units without the need for excessive welding of conduits between them. Furthermore, such systems have been sought which are capable of handling expensive gases so that the amount of gas lost to dead space in interconnecting pipes is kept to a minimum. Such systems are particularly useful in connection with processes for the growth of crystals such as in the production of semiconductors, and in which such epitaxial systems employ various generally expensive gases which must be carefully controlled and monitored.

SUMMARY OF THE INVENTION

In accordance with the present invention, it has now been discovered that these and other objects can be accomplished by the provision of apparatus for handling gaseous streams comprising modular flow block means including a plurality of gas flow paths extending through said modular flow block means so as to provide a plurality of port members on respective surfaces of said modular flow block means, a plurality of valve pastures extending into said modular flow block means so as to intercept said gas flow paths at predetermined locations throughout said modular flow block means, each of said plurality of valve passages including an entrance aperture on a respective surface of said modular flow block means, a plurality of valve flange members, each of said valve flange members being adapted to mount a high vacuum valve on said modular flow block means at one of said entrance apertures without the need to apply a rotational force to said valve flange members, so as to removeble, hermetically seal said high vacuum valve onto said modular flow block means, and each of said plurality of port members including port member mounting means whereby conduits can be removable, hermetically sealed to said respective plurality of port members.

In accordance with one embodiment of the apparatus of the present invention the high vacuum valves comprise bellows valves.

In accordance with another embodiment of the apparatus of the present invention, the apparatus includes a plurality of conduit flange members, each of the conduit flange members being adapted to mount a conduit on the modular flow block means at one of the plurality of port members without the need to apply rotational force to the conduit flange member so as to removably, hermetically seal the conduits onto the modular flow block means.

In accordance with another embodiment of the apparatus of the present invention, the plurality of valve flange members comprises a plurality of annular rings. In a preferred embodiment, the plurality of entrance apertures for the plurality of valve passages includes an annular recess adapted to receive a respective one of the plurality of valve flange members. In a preferred embodiment, each of the annular recesses includes a plurality of threaded apertures, and each of the valve flange members includes a corresponding plurality of fitted apertures, whereby the valve flange members can be mounted on the modular flow block means by fixing a plurality of screws through the corresponding threaded apertures on the valve flange members and the annular recesses.

In accordance with a preferred embodiment of the apparatus of the present invention, the apparatus includes a plurality of modular flow block means, whereby at least one of the plurality of port members on one of the modular flow block means is hermetically sealed to one of the plurality of port members on another of the modular flow block means by means of the conduit being mounted on both of the modular flow block means at the respective port members by a pair of the conduit flange members.

In accordance with anothee embodiment of the apparatus of the present invention, the plurality of entrance apertures for the plurality of valve passages includes an annular recess adapted to receive a corresponding flange on one of the high vacuum valves. In a preferred embodiment metallic gasket means are provided interposed within the annular recess whereby the high vacuum valve can be sealingly mounted on the modular flow block means.

In accordance with another embodiment of the apparatus of the present invention, the plurality of port members includes an annular port member recess, and each of the annular port member recesses includes an annular projection thereon, and including metallic gasket means applied to the annular porjection whereby the conduits can be sealingly mounted on the modular flow block means.

In accordance with another aspect of the apparatus of the present invention, it has also been discovered that these and other objects can be accomplished by providing apparatus for handling gaseous streams comprising modular flow block means, including a plurality of gas flow paths extending therethrough so as to provide a plurality of port members on respective surfaces of the modular flow block means, each of the plurality of port members including port member mounting means, at least one conduit member, including a first end and a second end, the first end including an end face adapted for mating engagement with one of the plurality of port members, the end face including an annular ridge thereon, whereby the conduit member can be hermetically sealed to the port member with metallic gasket means therebetween, and a conduit flange member mounting the first end of the conduit member and being attachable to the modular flow block means at the port member without the need to apply rotational force to the conduit flange member in order to do so.

In accordance with one embodiment of this aspect of the apparatus of the present invention, the modular flow block means comprises a first modular flow block means, and the apparatus includes a second modular flow block means including a plurality of gas flow paths extending therethrough so as to provide a plurality of port members on respective surfaces of the second modular flow block means, each of the plurality of port members including port member mounting means, and wherein the second end of the conduit member includes an end face adapted for mating engagement with one of the port members on the second modular flow block means. Preferably, the second end face also includes an annular ridge so that the conduit member can be hermetically sealed to both the port members on the first and second modular flow block means with metallic gasket means therebetween.

In a preferred embodiment of this aspect of the apparatus of the present invention, the conduit flange member comprises a first conduit flange member, and the apparatus includes a second conduit flange member mounting the second end of the conduit member and being attachable to the second modular flow block means at one of its port members without the need to apply rotational force to the second conduit flange member in order to do so.

In accordance with another embodiment of this aspect of the apparatus of the present invention, the modular flow block means includes at least one valve passage extending into the modular flow block means so as to intercept at least one of the gas flow paths at a predetermined location within the modular flow block means, with this valve passage including an entrance aperture on a surface of the modular flow block means, and the apparatus also includes a valve flange member adapted to mount an ultra-high vacuum valve on the modular flow block means at the entrance aperture without the need to apply rotational force to the valve flange member so as to removably, hermetically seal the ultra-high vacuum valve onto the modular flow block means.

In accordance with another embodiment of this aspect of the apparatus of the present invention, the modular flow block means includes a plurality of flow block passages extending into the modular flow block means so as to intercept the gas flow paths at predetermined locations throughout the modular flow block means, each of the plurality of valve passages including an entrance aperture on a respective surface of the modular flow block means, and a plurality of valve flange members, each of the valve flange members being adapted to mount an ultra-high vacuum valve on the modular flow block means at one of the entrance apertures without the need to apply rotational force to the valve flange members, so as to removably hermetically seal the ultra-high vacuum valve onto the modular flow block means.

BRIEF DESCRIPTION OF THE DRAWINGS

The present invention can be more fully understood and appreciated with reference to the following detailedll description, which in turn refers to the attached drawings, in which.

DETAILED DESCRIPTION

Figure 1:
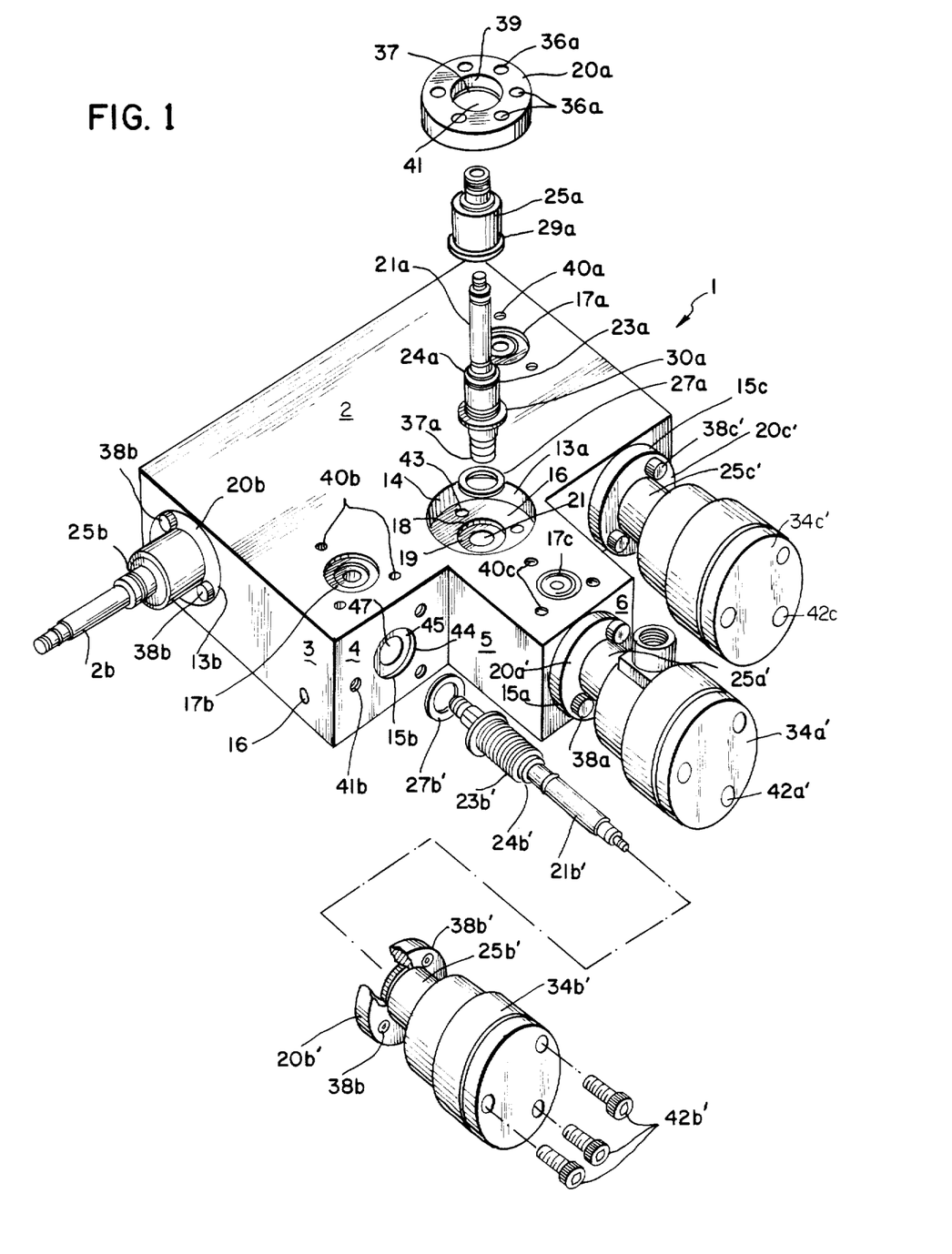
FIG. 1 is a perspective, front, elevational, partially exploded view of a modular flow block for use in connection with the apparatus of the present invention.

In connection with the following detailed description of a preferred embodiment of the modular flow block system of the present invention, like numerals refer to like portions thereof. Referring to FIG. 1, a particular embodiment of the present invention is shown in the form of a single modular flow block 1. The block itself is formed form a solid piece of corrosion resistant, inert stainless steel, which is free from voids and resistant to internal cracking. In the preferred embodiment which is illustrated in FIG. 1, the actual dimensions of this block were based upon the use of a stainless steel "preform" whose dimensions were 4"×4 178 "×1½". The final shape was then achieved by employing standard machining practices utilizing common milling and boring machines.

Figure 9:
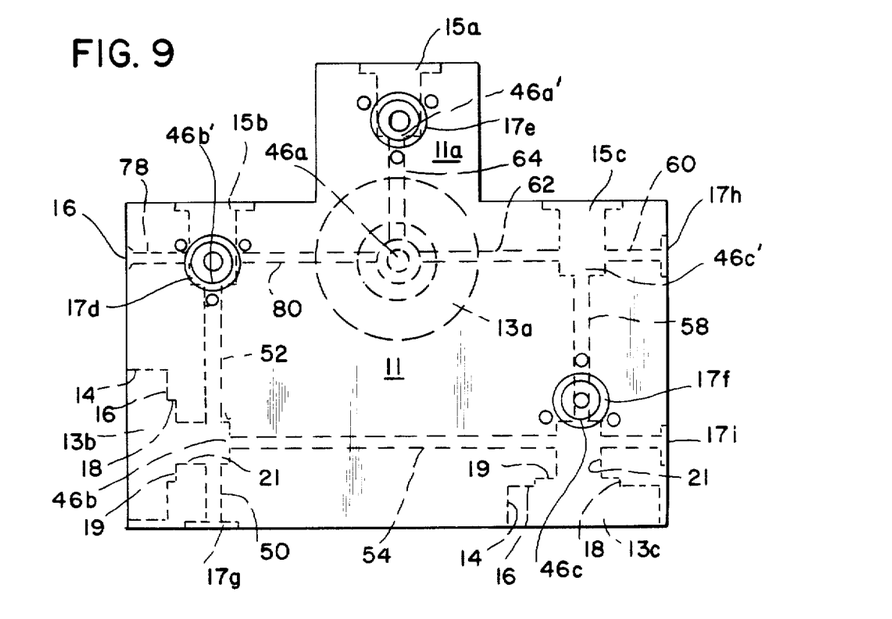
FIG. 9 is a bottom, elevational view of the modular flow block shown in FIG. 1.

The block itself in the case is an essentially rectangular solid having a top face 2 which includes a protruding portion 2a on one side thereof. The blcok itself thus includes a top face 2, a bottom face 11 (see FIG. 9), a left face which includes walls 3 and 5, a right face which includes walls 7 and 9, a front face which includes walls 4, 6 and 8, and a rear face which includes wall 10. Again, as indicated the entire block contained within these faces is a solid block of material except for flow passages and the various mounting means which will be discussed hereinafter, including means for mounting ultra-high vacuum valves on various surfaces, or faces, of the modular flow block itself.

The modular flow block 1 first includes a number of gas flow passages formed therethrough. Each of these gas flow passages terminates in a gas flow port 17a-f. Thus, referring for example to FIGS. 1, 2 and 5-9, gas flow ports 17b, located on the upper face 2 of the modular flow block, and 17d, located on the lower face 11 of the modular flow block 1, are interconnted by means of flow paths 70 and 72. In addition, these flow paths are interconnected by a valve chamber which will be discussed in more detail below.

Furthermore, however, the modular flow block 1 shown in FIG. 1 also includes additional flow paths created as follows:

gas flow port 17c on the top face 2 of the modular flow block 1 is connected to gas flow port 17e on the bottom face 11 of the modular flow block 1 through gas channels 66 and 68; gas flow port 17a on the top face 2 of the modular flow block 1 is connected to gas flow port 17f on the bottom face 11 of the modular flow block 1 through passages 74 and 76; the additional gas flow ports 17g–i are not directly connected by means of linear flow paths to additional gas flow ports, and will therefore be discussed in more detail below.

The modular flow block 1 also includes a number of valve passages which extend into the block to intercept the abovementioned gas flow paths and others at particular locations throughout the modular flow block. Each such valve passage is connected to an entrance aperture on one of the surfaces of the flow block. In the embodiment shown in FIG. 1 such valve apertures are shown for mounting six ultra-high vacuum valves on this single block. In this particular case three of the valve apertures are recessed and three are intended to mount the valves flush with one of the faces of the modular flow block. Thus, three depressed valve seats 13a, 13b and 13c, are included on top face 2, rear face 10, and left side face 3, respectively. In addition, three flush valve seats 15a, 15b and 15c, are located on raised front face 6, front face 4 and front face 8, respectively.

As for the nature of these valves themselves, these ultra-high vacuum valves are defined in the art as those which have a leak-tightness of better than $4 \times 10^{-9}$ std. $cm^3$ He/sec at pressures of below $10^{-6}$ torr. The particular ultra-high vacuum valves shown in the drawings are bellows valves, and all of their internal parts are constructed of corrosion resistant stainless steel, and must be "heli-arc" welded during assembly. As for the internal sealing member, it may be a soft stainless, or a low vapor pressure elastomer such as that designated KEL-F, a trademark of Minnesota Mining and Manufacturing Co. In generaly, these valves are designated commercially as bellows-sealed valves, and an example of a suitable such valve is that produced by the Nupro Company of Willoughby, Ohio.

These types of valves, and more particularly the ability to use them in the overall modular systens of this invention, form an important element thereof. Such systems are preferably employed, for example, in the gas handling procedures necessary for the commerical production of various semiconductors. In these systems not only is the extremely accurate handling of small amounts of gases a critical element thereof, but these systems also require the handling of very corrosive, toxic and/or expensive such gases, such as arsene, phosphine, hydrogen chloride, silane and the like. In these systems the prevention of leaks is an important requirement. In accordance with this invention, this can now not only be accomplished, but it can be done in a highly simplified and efficient system, and done where the connections are reversible, rather than permanent, as with typical welded connections.

Furthermore, by avoiding the prior art use of multiple welded connections, dead spaces within the device are avoided, again avoiding contamination as well as waste. Finally, not only can all of this be accomplished by means of this apparatus, but it can be done with a modular system which permits the easy erection of multiple parallel lines, for easy system expansion, etc.

In any event, returning to FIG. 1, the depressed valve seats 13a, 13b and 13c comprise an initial annular descending wall 14, terminating in annular transverse surface 16. The inner surface of annular transverse surface 16 then provides a second annular descending wall 18, which extends downwardly to annular transverse mounting surface 19. The inner face of annular transverse mounting surface 19 then extends downwardly through cylindrical descending wall 21 into a valve seat 46a–c, as can best be seen in FIGS. 6, 8 and 9.

The ultra-high vacuum valves used in the present invention can thus be mounted directly onto faces of the modular block 1 as follows. The ultra-high vacuum valve shown in FIG. 1 is a bellows-type valve. The valve itself thus comprises a bellows member 23a–c which is mounted on the main valve stem 21a–c. At the lower end of the main valve stem 21a–c is contained the sealing face 37a–c which is to be seated in the various valve seats. The main valve stem 21a–c is itself affixed to the bellows member 23a–c by means of mounting member 24a–c. The other end of the bellows member 23a–c is free-floating, and includes a front annular face 30a–c. In this manner, this annular face 30a–c can move relative to the main valve stem 21a–c which is surrounded by the bellows member 23a–c to which it is affixed at mounting member 24i a–c. An essentially cylindrical valve mounting ring 25 is slidably secured over the main valve stem 21 so that its forward end, which includes an outwardly extending flange 29, can abut against the upper surface of annular face 30. The upper end of the valve mounting ring 25 includes a portion of decreased circular cross-section which closely surrounds and cooperates with the main valve stem 21. In this manner, the valve itself can be inserted into one of the valve seats by inserting the forward end of the main valve stem 21 towards the valve seat until the annular face 30 fits snugly into the annular transverse mounting surface 19. In addition, a metal gasket 27a–c has previously been placed upon the annular transverse mounting surface 19, i.e. before the valve has been placed thereon. Final mounting and sealing of the valve onto the modular flow block 1 is thus obtained by sliding annular valve flange 20a–c over the upper surface of the main valve stem 21 and thus over the outer surface of valve mounting ring 25. The annular valve flange 20a–c itself includes an inner opening 37 which is intended to slidably fit snugly over the outer cylindrical surface of valve mounting ring 25, and to thus abut against the upper surface of flange 29 on valve mounting ring 25. Furthermore, the inner annular surface 39 of the valve flange 20a–c includes an annular recessed portion 41, so that when it is placed in position as described this annular recessed portion 41 engages the outer wall of flange 29 on mounting ring 25, thus providing substantially uniform mating surfaces as between the lower faces of the valve flange 20a–c and the face of the flange 29 on the valve mounting ring 25.

The valve flange 20a–c also includes a number of cylindrical apertures 36a–c around its circumference, in this case preferably being either 3 or 5 such apertures. Furthermore, a corresponding number of threaded apertures 43 are then included within the annular transverse surface 16. In this manner, when the valve is mounted as discussed above, the annular valve flange 20a–c will sit within the depressed area 13a–c, forming an essentially flush upper surface, and providing for final mounting and sealing of the valve by inserting screws 38a–c through the apertures 36a–c and then into the threaded apertures 43. By tightening these screws, and thereby drawing the valve as closely as possible into the depressed valve seat itself, the valve is not only firmly mounted thereon, but when employed in conjunction with metal gasket 27a–c, a hermetic seal is provided.

The other set of three valves 23a'–c' depicted in FIG. 1 operate in a similar manner to the valves discussed above in conjunction with depressed valve seats 13a–c, except that in this case they are not depressed, but are flush with the upper surface. In this case, the flush valve seats 15a–c include a single annular descending wall 44, terminating in annular transverse surface 45, the inner face of which thus extends downwardly through cylindrical descending wall 47 into a valve seat 46a'–c', as can best be seen in FIG. 2. Again in this case, the construction of the valve itself, and of the annular valve flanges 20a'–c', are identical to those discussed above with respect to the depressed valve seats, except that in this case, upon mounting, the annular valve flanges 20a'–c' will be mounted above the face of the block itself, again as can be seen in FIG. 1. Furthermore, in this case the surrounding face of the modular block 1 in question also includes three threaded apertures 41b, and in this case the corresponding annular valve flanges 20a'–c' would also include three corresponding cylindrical apertures extending therethrough. Once again, this provides for mounting of the ultra-high vacuum valves themselves directly onto the face of the modular flow block 1 by extending screws 38a–c' through these cylindrical apertures and into threaded apertures 41a–c on the flow block faces. In this case metal gaskets 27a'–c' are again employed, and a hermetic seal is again produced.

With respect to the production of hermetic seals in this case, two principal factors can be discussed. Primarily, an important improvement which can be realized in connection with this invention relates to the fact that, once mounted, the final installation and mounting of the valves is obtained by linear movement of the annular valve flange 20 against the face of the block. In this regard, reference is made to FIGS. 10 and 11, in which a typical prior art technique for mounting the same type of ultra-high vacuum valve is shown. In this case, however, there is provided a supporting cube 90 which includes valve seat 104, and which has an upper face upon which is upstanding circular wall 92. The external surface of the circular wall 92 includes threads 112, and this upper face also includes a depressed annular surface 94 extending into a descending cylindrical chamber 96, at the bottom of which is located valve seat 104. In this manner, the same types of valves as are discussed above can be mounted on top of the annular mounting surface 93, with valve stem 108 extending into the valve seat 104. In this case, however, mounting is obtained by means of a slip ring 110 which is slipped over the valve itself, and which extends downwardly as shown. Thus, the downwardly extending annular wall 122 thereof includes an inner, threaded portion 114, with threads capable of mating with the threads 112 on the outer surface of the upstanding wall 92. The upper end of this slip ring 110 is affixed to the valve by means of inwardly projecting annular wall 117, which slidably engages the outer surface of the valve mounting ring 25 previously discussed. Mounting is thus obtained by placing the valve in position, moving the slip ring 110 downwardly until threads 114 engage corresponding threads 112, and then threadingly affixing the valve to the mounting cube 90. However, in this case a high degree of accuracy is much more difficult to obtain, since the final mounting is provided by circular rotation of slip ring 110, and stripping or overtightening is common. The present invention, and the inclusion of means for direct linear movement of the annular valve flange 20 against the surface by means of separate screws, is highly superior thereto.

Figure 2:
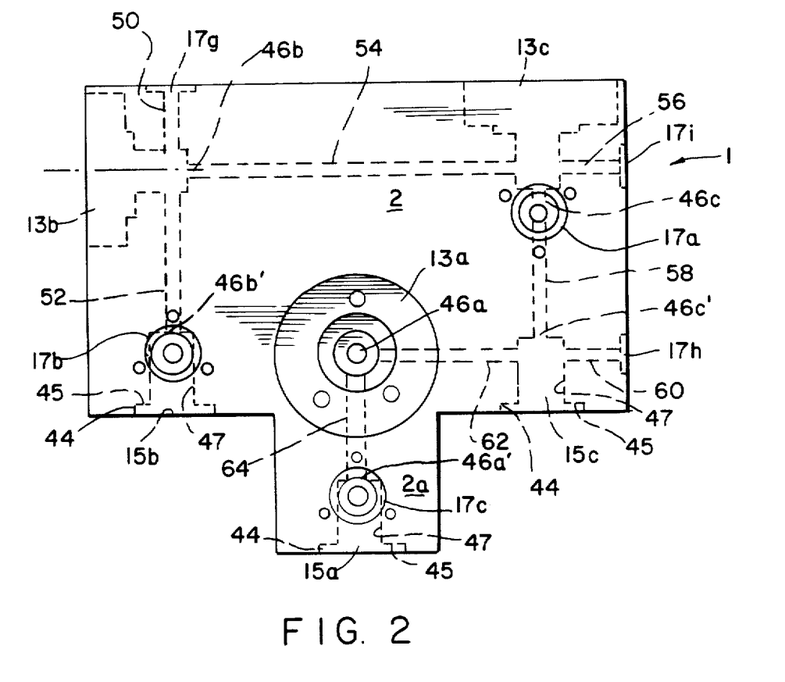
FIG. 2 is a top, elevational, partially diagramatic view of the modular flow block shown in FIG. 1.

Turning back to FIGS. 1-9, it is again noted that each of the valve ports extends into a valve passageway. Thus, the depressed valve seat 13a on the top face 2 of the modular flow block 1 extends downwardly into a closed valve seat 46a as shown in FIG. 2. However, the inner walls of descending cylindrical portion 21 in this case include two openings, a forward opening which is connected through passage 64 to a further valve seat, which will be discussed below, and a second side passageway 62, which is connected to gas flow port 17h, discussed above. Depressed valve seat 13b, which is located on left face 3 of modular flow block 1, includes an open valve seat 46b extending directly into passage 54, and then through passage 56 to gas flow port 17i. In addition, the side walls of descending cylindrical wall 21 in depressed valve seat 13b includes a pair of opposed openings, i.e. a rearward opening extending through passage 50 into gas flow port 17g, and a forward opening extending into passage 52 and then another valve, also to be discussed in more detail below.

As for depressed valve seat 13c, which is located on rear face 10 of the modular flow block 1, and as can best be seen in FIGS. 2 and 4 thereof, valve seat 46c is an open valve seat, thus continuing downwardly through passage 58 into another valve seat, which will again be discussed in more detail below. In this case, the descending cylindrical wall 21 of depressed valve seat 13c also includes two oppositely disposed passages, generally comprising passages 54 and 56 discussed above, which terminate in gas flow port 17i and depressed valve seat 13b, respectively.

The flush valve seats 15a, 15b and 15c located on front faces 4, 6 and 8, respectively, are similarly connected to various valve passages. Thus, flush valve seat 15a has an open valve seat 46a' which descends rearwardly through passage 64 into the descending cylindrical wall 21 located above valve seat 46a in depressed valve seat 13a. In addition, the descending circular wall 21 in flush valve seat 15a includes a single upward opening extending into passage 66 and into gas flow port 17c thereabove.

Flush valve seat 15b, located on front face 4, also includes an open valve seat 46b' extending downwardly into passageway 52, as discussed above, which extends into the wall of descending cylindrical side wall 21 in depressed valve seat 13b.

Finally, flush valve seat 15c again has an open valve seat 46c', in this case extending into passage 58, also discussed above, which extends into the bottom of open valve seat 46c in depressed valve seat 13c. Also, the walls of cylindrical descending wall 21 in flush valve seat 15c include oppositely disposed openings, including a leftwardly extending passage 62 connecting this wall with the descending circular wall 21 in depressed valve seat 13a, and a rightwardly extending passageway 60 extending into gas flow port 17h.

As can thus be seen, each of the valve passages intercepts gas flow paths at various locations throughout the block. Furthermore, that interception includes interception with the valve seats themselves, whereby the passages can be opened and closed by seating of the valve itself within these respective valve seats. Thus, as an example, the closing of the valve contained in depressed valve seat 13c by sealing of valve seat 46c, effectively closes off passages 58, 74 and 76 with respect to passages 54 and 56.

It can also be pointed out that a blind passage 16 is included in this block, in this case extending from face 3 of modular block 1. This passage 16 extends directly through the block, and through interconnecting passage 72, which extends from gas flow port 17b, and then onwardly through passage 80 directly into the bottom portion of the valve seat 46a and depressed valve seat 13a. In this manner, the closing of the valve contained in depressed valve seat 13a by seating of the face of the valve stem therein, effectively seals off passage 80 from those passages which enter the annular chamber above valve seat 46a, i.e. passages 62 and 64.

Figure 3:
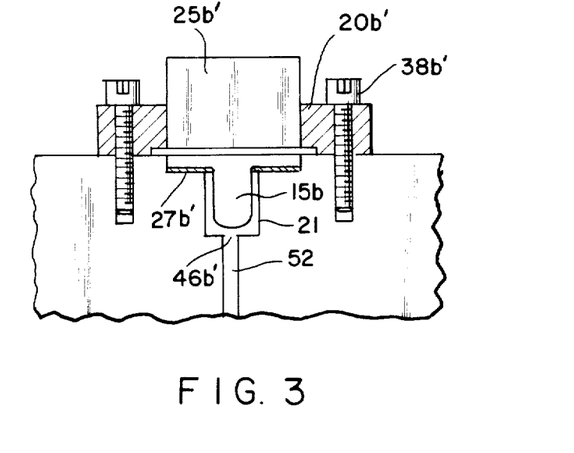
FIG. 3 is a side, elevational, partially sectional view of an ultra-high vacuum valve mounted on a portion of a modular flow block in accordance with the present invention.
Figure 10:
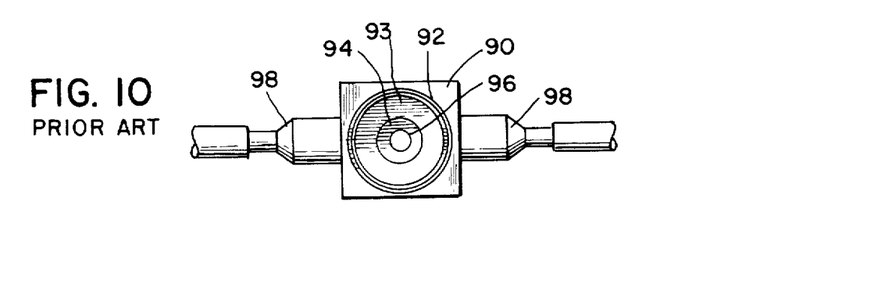
FIG. 10 is a top, elevational view of a mounting for a valve of the prior art.
Figure 11:
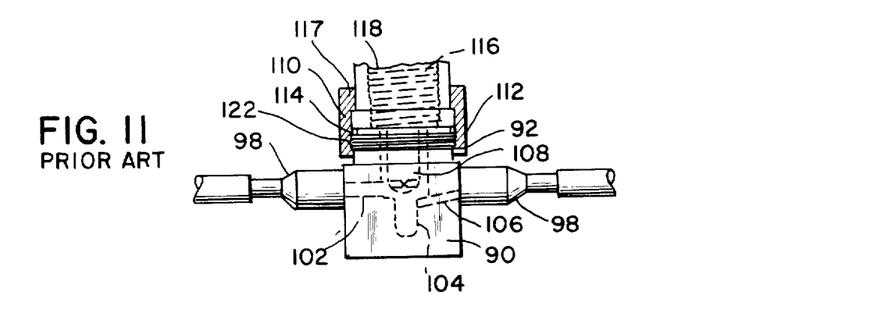
FIG. 11 is a side, elevational, partial view of the mount shown in FIG. 10 in connection with an ultra-high pressure valve mounted thereon.

The mounting of the ultra-high vacuum valves 34 themselves into the various valve seats, as discussed above, forms an essential element of the present invention. Thus, in accordance with this system, not only is it now possible to employ ultra-high vacuum valves in connection with a modular gas handling system, but they can be removably and hermetically sealed to the system in an efficient and unique manner. In this regard, reference is specifically made to FIG. 3 herein. While this figure is shown in connection with the application of one of these valves to a flush valve seat, of the type shown at 15b in FIG. 1, it applies with equal force to the application of such a valve to one of the depressed valve seats shown in that figure. In any event, the metallic gasket 27b' is placed within the valve seat 15b upon the transverse annular surface 18 surrounding the passage 21 leading to valve seat 46b'. The valve itself can now be applied to the surface of the modular flow block, again as shown, for example, in FIG. 1. The essential components which are now affixed in a hermetic and removable manner to the block are the valve 23b' and the valve mounting ring 25b'. The valve 23b' is then inserted through the metal gasket, and into the valve seat 15d. The valve mounting ring 25b' is then passed over the valve 23b' engaging annular flange 30 and providing outwardly extending flange 29. In this manner, the valve can be secured to the face of the modular flow block by application of valve flange 20b' over the valve and the valve mounting ring, so as to engage the outwardly extending flange 30 so that the valve can thus be hermetically sealed into the valve seat 15b by attachment of screws 38b' into threaded aperture 41b on the face of the block. Furthermore, in this process the metal gasket 27b' initially placed upon the transverse annular surface 18 is caused to "flow" under the increased pressure created by screwing down screws 38b', as shown in FIG. 3. The metal gaskets themselves are produced from metals which have the same corrosion-resistant properties as the other components of the valve block, and preferably they are made from materials such as nickel or annealed stainless steel. The gaskets themselves can be stamped from a flat 0.025 inch thick sheet of metal, which is chosen so as to be free of internal voids or pores. The gaskets themselves will thus flow freely in the subject environment, so as to completely fill the space between the annular surfaces in question, and provide for the hermetic seal discussed above. As can be seen with reference to the above discussion of the prior art valve seats shown in FIGS. 10 and 11, the ability to clamp the valve directly onto the surface by means of screws 38b' without applying any rotational force to the flange 20b' or other element securing the valve to the face of the block, presents a distinct advantage. Stripping of the threaded engagement shown in FIGS. 10 and 11 is avoided, and a hermetic seal can now be easily and safely provided for, and this can also be done in a reversible manner.

Figure 15:
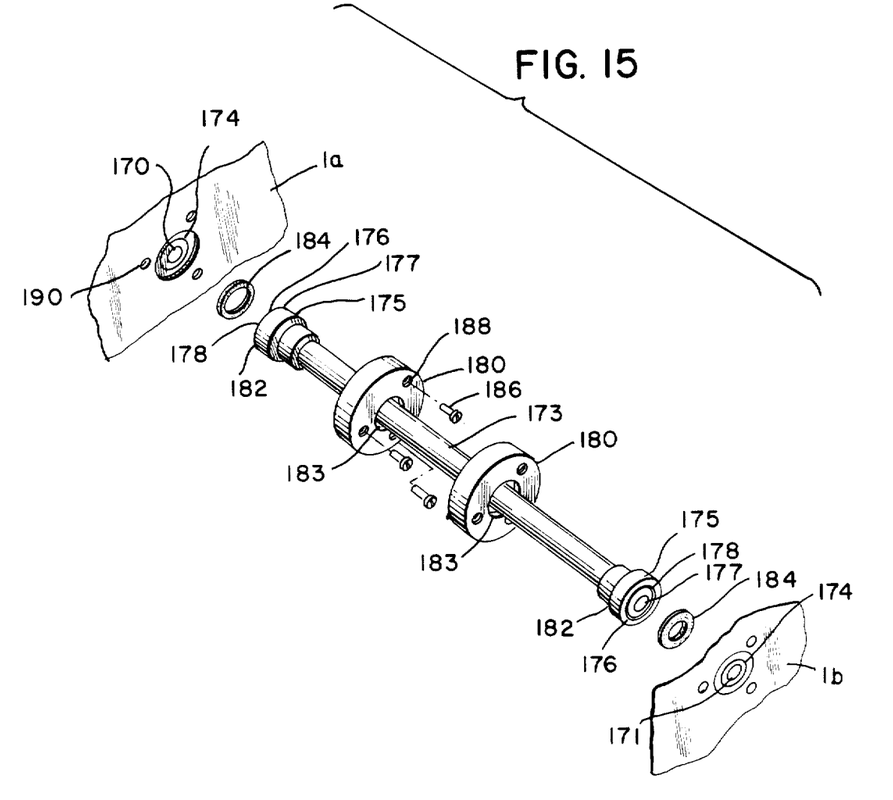
FIG. 15 is a partial, elevational, exploded view of the means of the present invention for connecting together a pair of modules.

Turning next to FIG. 15, apparatus for affixing conduits to the various gas flow ports on the faces of the modular flow block, and for therefore connecting together more than one module and providing hermetically sealed gas paths therebetween, are shown therein. Referring to FIG. 15, portions of two modular flow blocks 1a and 1b are shown therein. Modular flow block 1a includes a gas flow port 170 and modular flow block 1b includes a gas flow port 171, which are substantially the same as the gas flow ports shown and discussed in connection with the prior discussion of FIG. 1. In order to connect these two gas flow ports to each other, and to thus hermetically seal modular flow block 1a to modular flow block 1b, an interconnecting conduit 173 is provided. This conduit 173 includes an expanded end portion 175 at either end thereof. On their transverse end faces 176, which is an annular face surrounding entrance ports 177, there is also provided an annular ridge 178, which has an essentially triangular cross-sectional shape, and which surrounds entrance ports 177. Freely slidable along the interconnecting conduits 173 are a pair of annular flanges 180. These flanges have an internal diameter providing an opening sufficiently large to freely move along the surface of the interconnecting conduit 173. In addition, the inner diameters of these flanges 180 are essentially dimensioned to snugly coincidence with the outer diameter 182 of the expanded end portions 175 of the interconnecting conduit 173. The internal diameter of these flanges, however, includes a recessed annular flange portion 183, which thus prevents the flange from being removed from the end of these tubular conduits over the expanded end portion 176. When these flanges 180 are thus at the furthest extent of their movement toward the end faces 177, they present an essentially flat, planar face for attachment to the face on the modular flow block in question.

When that face is brought into contact with one of the gas flow ports, such as gas flow port 170 or 171, an intermediate metal gasket 184 is first interposed therebetween. The metal gasket 184 has a diamaeter which essentially corresponds to the diameter of the annular ridge 178 on the end face 177. Furthermore, the gas flow port 170 also includes an annular ridge 174 encircling the central passageway therein, this annular ridge 174 corresponding in both dimension and shape to the annular ridge 178 on the end face 177 of the conduit 173. Therefore, when the end face 177 is compressed up against the gas flow port with metal gasket 184 therebetween, the metal gasket is clamped between the annular ridges 178 and 174. By sliding the ring 180 up against the end face as discussed above, and screwing it into position by means of screws 186, which extend through apertures 188 in ring 180, and are then threaded into threaded apertures 190 encircling the gas flow ports 170 and 171, a hermetic seal can be produced therebetween. The metal gaskets can again flow under the pressures created here, and particularly around the annular ridges 174 and 178 between which they are clamped.

Figure 16:
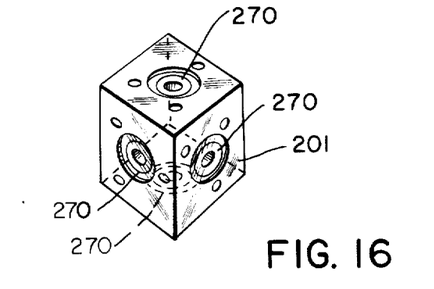
FIG. 16 is a front, elevational view of a junction block for use in connection with the present invention.

Turning to FIG. 16, a junction block 201 forming another modular flow block of the present invention is shown therein. Such a junction block is basically a block of solid metal, preferably in the shape of a cube, and having a number of gas flow ports 270 on various faces thereof. Each of these flow ports 270 is connected to a passageway extending through the block, preferably to another gas flow port on the opposite face of the block 201. In this manner, junction blocks of this type can be used for interconnecting a variety of conduits, such as interconnection conduit 173 discussed above in connection with FIG. 15, or a number of modular flow blocks 1a, 1b and the like can each be interconnected to a junction block, such as junction block 201, and then to each other. The variety and methods for thus handling and transferring various gas streams throughout this modular system then becomes essentially endless.

Figure 12:
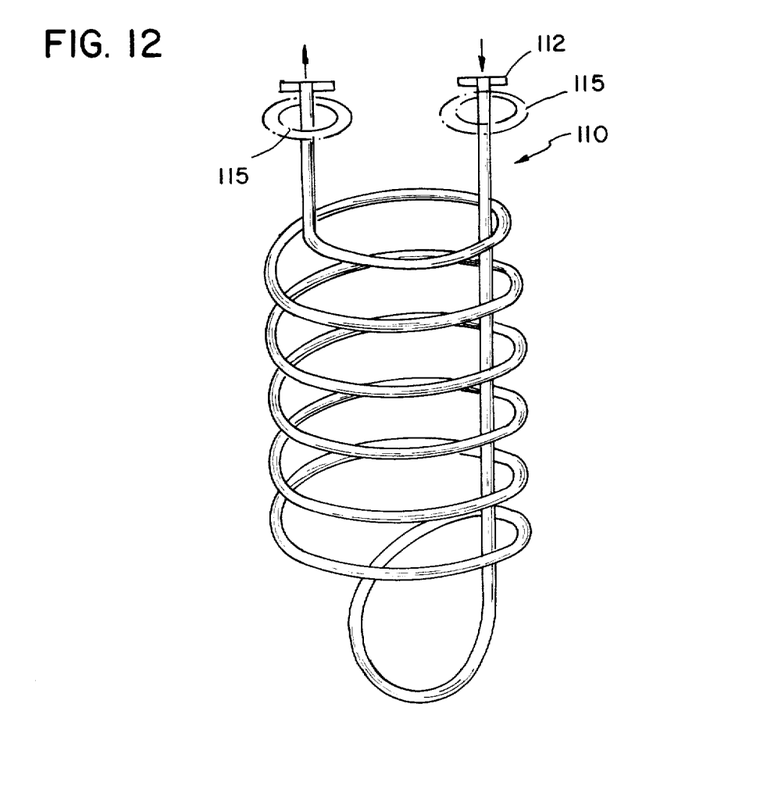
FIG. 12 is a side, elevational view of a cooling coil for use in connection with the modular flow blocks of the present invention.
Figure 13:
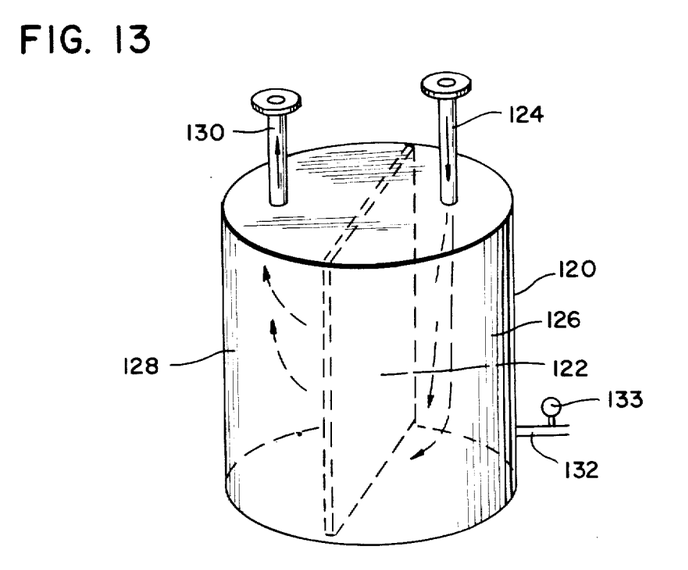
FIG. 13 is a side, elevational, partly representational view of a membrane cleaner for use in connection with the modular flow blocks of the present invention.
Figure 14:
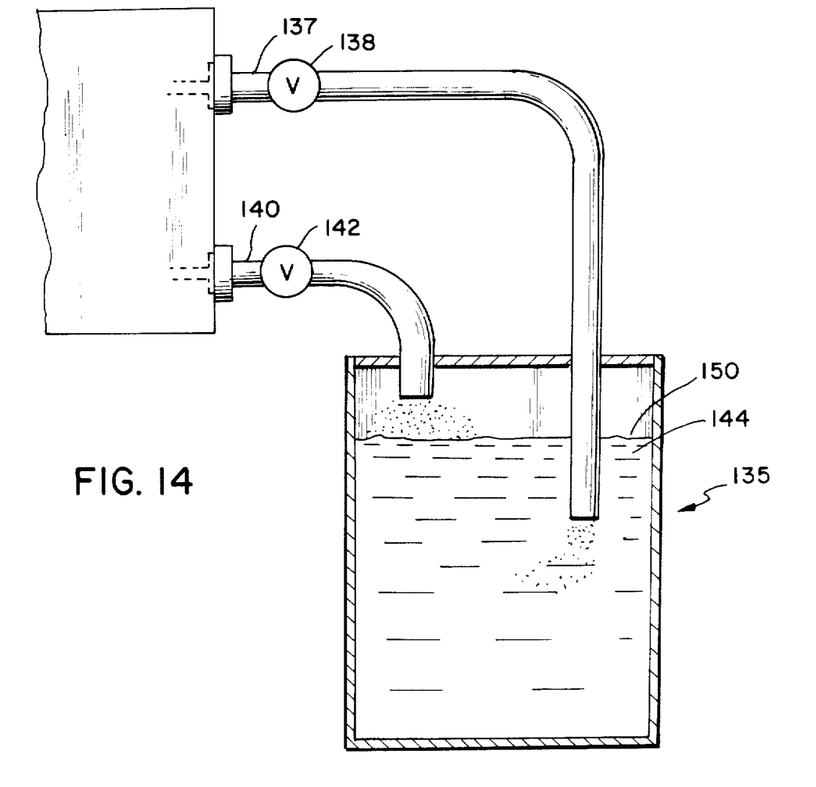
FIG. 14 is a partial, side, partially sectional view of a bubble chamber used in connection with a modular flow block of the present invention.

A number of additional attachments or devices which can be used in connection with the modular flow block system of the present invention are shown in FIGS. 12-14.

Referring to FIG. 12 a cooling coil 110 is shown therein. Such a coil can be hermetically sealed to a pair of adjacent gas flow ports on a modular flow block of the present invention, such as for example, adjacent flow ports 17h and 17i shown in face 9 of modular flow block 2 in FIG. 4. The cooling coil itself is essentially a helically wound coil, as shown through which a gas can be passed and cooled externally. The ends of the coil include expanded end portions 112, which basically correspond to the end faces 178 on the interconnecting conduit 173 discussed in FIG. 15. These faces can thus be hermetically sealed to the gas flow ports 17i and 17h for example by utilizing a pair of rings 115 as shown in FIG. 12 for affixing same in the same manner as the conduit 173 is affixed to the modular flow block units discussed above.

Figure 4:
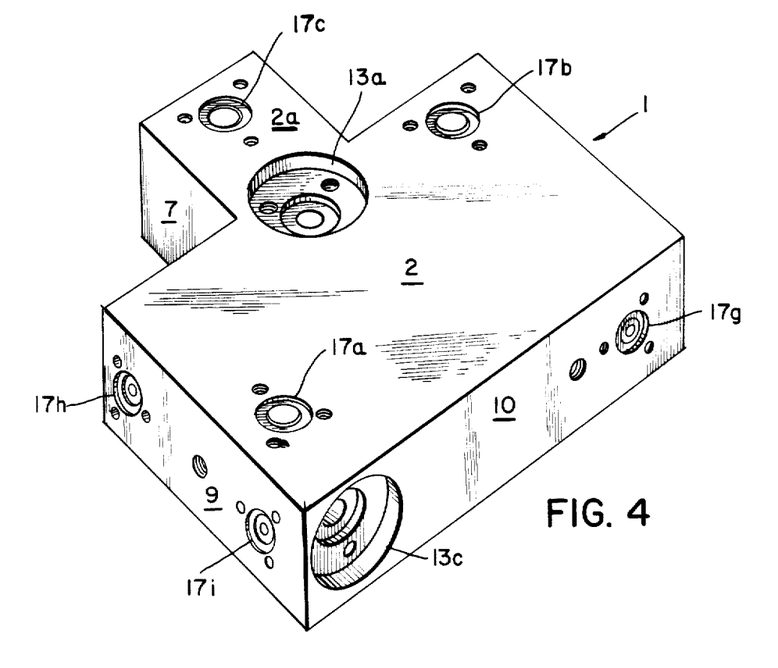
FIG. 4 is an elevational, rear view of the modular flow block shown in FIG. 1.
Figure 5:
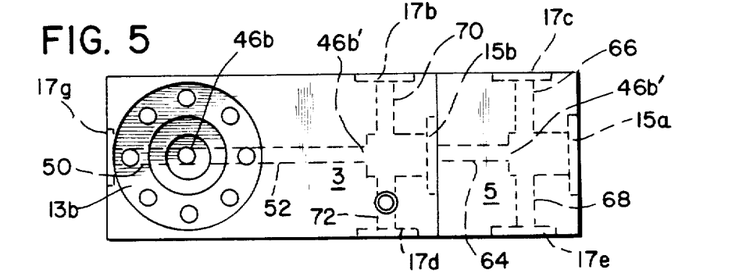
FIG. 5 is a left side, elevational view of the modular flow block shown in FIG. 1.
Figure 6:
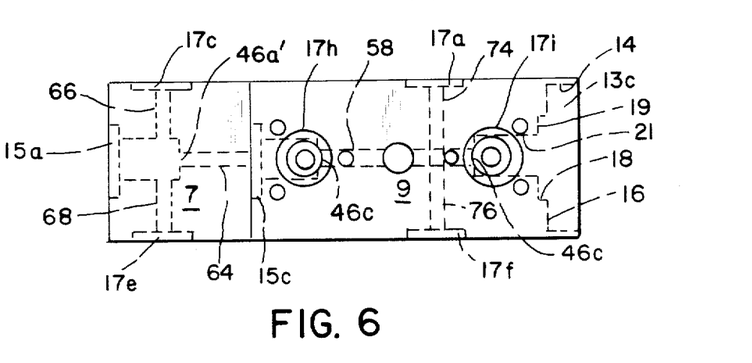
FIG. 6 is a right side, elevational view of the modular flow block shown in FIG. 1.
Figure 7:
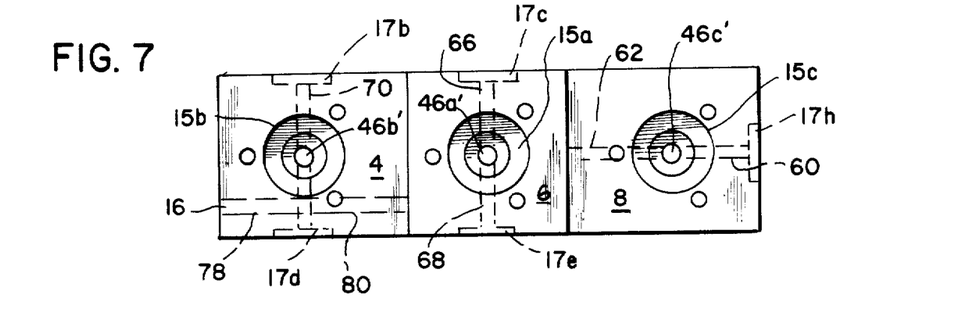
FIG. 7 is a front, elevational view of the modular flow block shown in FIG. 1.

Turning to FIG. 13 a membrane chamber 120 is shown therein with similar means for affixing same to a pair of adjacent gas flow ports, again such as 17i and 17h shown in FIG. 4. In this case, the membrane chamber 120 comprises a closed cylindrical chamber which is divided into two separate chambers by means of a membrane 122 disposed therebetween. Gas can thus be passed through this membrane for purification by being passed out of a modular flow block unit through conduit portion 124, thus into chamber 126, for passage through membrane 122, into second chamber 128, and then out through conduit portion 130 into another gas flow port in the same or a different modular flow block A release vent 132 is also provided with valve 133 for evacuation purposes.

Turning to FIG. 14, a bubble chamber 135 is shown therein. In this case the chamber is once against affixed to a pair of gas flow ports in the same manner, in this case including conduit portion 137 including valve 138, and return conduit portion 140 including valve 142 thereon. These two conduit portions extend into a closed chamber 144, with the first entrance conduit portion 137 extending below a liquid level 150 therein so that gas exiting the modular flow block through conduit portion 137 will bubble through the liquid 150 contained therein. After doing so and passing above the liquid level 150, that gas can then exit through shorter exit conduit 140 whose end it disposed above the liquid level 150 therein, and then return to the modular flow block in the manner discussed above.

In order to more fully appreciate the nature of the present invention, this invention will now be applied to a preferred embodiment, in which it is utilized for the growth of thin layers of the semiconductor Gallium Arsenide using the metal-organic chemical vapor deposition process. Using the apparatus set forth in the figures, a metal-organic chemical, such as Dimethyl Gallium, is placed in a chamber 120, as shown in FIG. 13. Chamber 120 containing this liquid is then attached and hermetically sealed to a pair of adjacent gas flow ports 17i and 17h, as shown in FIG. 4. This attachment and hermetic sealing is thus carried out as described in this specification using conduit portions 124 and 130, which include at their ends corresponding expanded end portions, such a those shown at the ends of conduit 173 in FIG. 15. Metal gaskets are interposed between these expanded end portions and the gas flow ports, in the manner also discussed above. Finally, a pair of flanges 180 are used to sealingly and hermetically afix the conduit thereto, by means of screws 186 and threaded apertures 190, again as shown in FIG. 15.

A conduit for a carrier gas, such as hydrogen, in then attached and hermetically sealed to the gas flow port 17c located on the upper face 2a of the modular block shown in FIG. 1. A gas conduit is attached and hermetically sealed to port 17e, for directing this carrier gas to a corresponding port 17c of another block and/or eventually into the growth chamber. In this manner, passages 66 and 68 become part of the "growth" line that is continually purged by the carrier gas.

Another conduit for a carrier gas, such as hydrogen, is then attached and hermetically sealed to the gas flow port 17b located on the upper face 2 of the modular block shown in FIG. 1. A gas conduit is attached and hermetically sealed to port 17d for directing this carrier gas to a corresponding port 17b of another block and/or eventually into the exhaust line. In this manner, passages 70 and 72 become a part of the exhaust line that is continually purged by the carrier gas.

The two gas carrier flows described above are relatively large flows of gas, having the sole function of transporting the growth gas mixture away from the modular block and into the crystal growth chamber, or into the exhaust, as desired.

Figure 8:
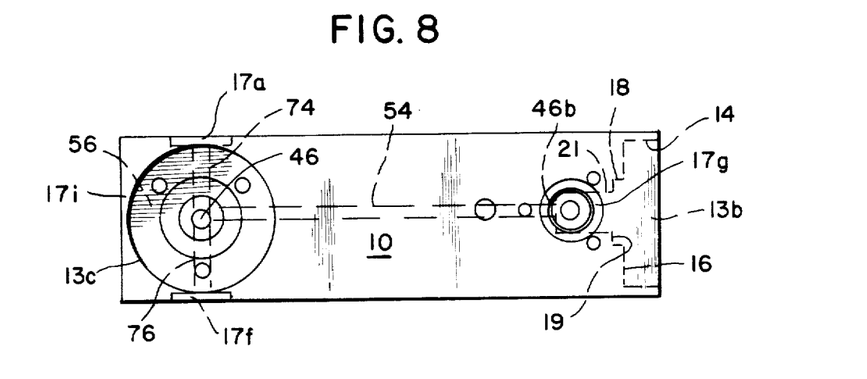
FIG. 8 is a rear, elevational view of the modular flow block shown in FIG. 1.

A third conduit for carrier gas is attached and hermetically sealed to the gas flow port 17g located on face 10 of the modular block, as shown in FIG. 8. This carrier gas is directed through the various passages of the modular block as to best create the growth gas mixture, as is described below.

In addition, a vacuum pump is sealed to port 17a, and exit port 17f is sealed closed or a vacuum conduit continues the vacuum line to a corresponding port 17a of another modular gas block.

In actually using this apparatus in such a crystal growth procedure, the valves contained in depressed valve seat 13c and flush valve seat 15c are opened, while the four other valves, i.e. those in depressed valve seats 13a and 13b, and flush valve seats 15a and 15b, are closed. The application of a vacuum pump through exit port 17a thus results in a flushing process for removing all air and water vapor from valve seat 46b, which is closed by the valve in depressed valve seat 13b, through lines 54 and 56, to the entrance to the container affixed to exit port 17i, as well as valve seat 46a', which is closed by the valve in flush valve seat 15a, through lines 58, 64, 62 and 60, thereby removing all air and water vapor from these lines, and from valve seats 46a' and 46a, through to the connection to the container at exit port 17h. This process prevents later contamination of the high purity gas streams and pure chemicals which will be utilized during the initiation of the system and during replacement of these chemicals.

The valves contained in valve seats 13c and 15c are then closed, as are those contained in the valve seats 13a, 13b and 15a, while the valve contained in valve seat 15b is then opened. A precisely metered flow of the input gas stream is then injected through exit port 17g, and thus through passages 52 and 50. This gas stream thus purges the bellows of the valves contained in valve seats 13b and 15b, and then exits into the exhaust gas stream through port 17d.

As soon as this input gas flow is equilibrated, and stagnant gases are flushed from the system, the valves contained in valve seats 13a and 13b can be opened, and the valve contained in valve seat 13b simultaneously closed. In this manner, the hydrogen carrier gas can now enter previously evacuated passage 54, and pass through passage 56 through the metal-organic chemical reservoir 120 attached to exit ports 17i and 17h, in order to pass therethrough. In this manner, the carrier gas becomes saturated with the metal-organic chemical, and then proceeds through passages 60 and 62, which had also been previously evacuated, through the valve chamber and the valve contained in valve seat 13a and, since that valve is open, through passage 80, into channels 70 and 72, into the exhaust line.

After a further period of equilibration, and then only for that period of time during which the particular metal-organic chemical is required in the crystal growth process, the valve contained in valve seat 13a then closes, and the valve contained in valve seat 15a opens, so that the precisely metered gas mixture of carrier gas and metal-organic vapor is then injected into the growth mixture, into passages 66 and 68, i.e. the "growth" line.

It is finally noted that the carrier gas in the growth line continuously flushes the valve stem and bellows of the valve contained in valve seat 15a, i.e. even when that valve is closed. This therefore prevents accumulation of stagnant gas and other gases from contaminating the growth gas.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What I claim is:

1. Apparatus for handling gaseous streams comprising a unitary modular flow block including a first valve passage extending into said modular flow block, said first valve passage including a first valve entrance aperture and a first valve seat, whereby a first valve including a reciprocating valve shaft mounted in said first valve passage can selectively open and close said first valve seat, a second valve passage extending into said modular flow block, said second valve passage including a second valve entrance aperture and a second valve seat, whereby a second valve including a reciprocating valve shaft mounted in said second valve passage can selectively open and close said second valve seat, a first gas flow path extending through said modular flow block along a first predetermined path which includes a portion connecting said first valve seat with said second valve passage at a predetermined location between said second valve seat and said second valve entrance aperture, and a second gas flow path extending through said modular flow block along a second predetermined path which includes said second valve seat, whereby closing of said first valve seat closes said first gas flow path and closing of said second valve seat closes said second gas flow path, while a gas flowing through said first gas flow path can flush said predetermined location in said second valve passage even when said second valve seat has been closed and flushing of said second valve seat can be controlled by said first valve.

2. The apparatus of claim 1, wherein said first and second gas flow paths include first and second gas ports on the surface of said modular flow block, whereby gases may be injected into said first and second gas flow paths from locations outside of said modular flow block.

3. The apparatus of claim 2, wherein said first and second gas ports include gas port mounting means, whereby conduits may be removably, hemetically sealed to said first and second gas ports.

4. The apparatus of claim 2, including a third gas flow path extending through said modular flow block, said third gas flow path including a third gas port.

5. The apparatus of claim 4, including cooling coil means having an inlet and an outlet, said inlet for said cooling coil means being mounted on said first gas port and said outlet for said cooling coil means being mounted on said third gas port, whereby a gas can be cooled while flowing through said cooling coil means between said first and third gas ports.

6. The apparatus of claim 4, including membrane chamber means having an inlet, an outlet and a membrane mounted therebetween, said inlet for said membrane chamber being mounted on said first gas port and said outlet for said membrane chamber being mounted on said third gas port, whereby a gas can be purified by passing through said membrane between said first and second gas ports.

7. The apparatus of claim 4, including bubble chamber means having an inlet and an outlet, said inlet for said bubble chamber means including extension means for injecting a gas flowing through said inlet below the level of a liquid maintained within said bubble chamber means being mounted on said first gas port and said outlet for said bubble chamber means being mounted on said third gas port, whereby a gas can be bubbled through a liquid within said bubble chamber means while flowing through said bubble chamber means between said first and third gas ports.

8. The apparatus of claim 1, including a third valve passage extending into said modular flow block, said third valve passage including a third valve entrance aperture and a third valve seat, whereby a third valve including a reciprocating valve shaft mounted in said third valve passage can selectively open and close said third valve seat, and a third gas flow path extending through said modular flow block along a third predetermined path which includes said third valve seat, and wherein said second predetermined path connects said second valve seat with said third valve passage at a predetermined location between said third valve seat and said third valve entrance aperture, whereby closing of said third valve seat closes said third gas flow path, while a gas flowing through said second gas flow path can flush said predetermined location in said third valve passage even when said third valve seat has been closed, and flushing of said third valve seat can be controlled by said second valve.

9. The apparatus of claim 8, including a plurality of additional valve passages extending into said modular flow block, said plurality of additional valve passages including a plurality of additional valve entrance apertures and a plurality of additional valve seats, whereby a plurality of additional valves including reciprocating valve shafts mounted in said plurality of additional valve passages can selectively open and close said plurality of additional valve seats, and a plurality of additional gas flow paths extending through said modular flow block along a plurality of additional predetermined paths which include said plurality of additional valve seats, and wherein each of said plurality of additional predetermined paths connects one of said plurality of additional valve seats with a different one of said plurality of additional valve passages at a predetermined location between said valve seat associated with said different one of said plurality of additional valve passages and said valve entrance aperture associated with said different one of said plurality of additional valve passages, whereby closing of each of said plurality of additional valve seats closes said associated one of said plurality of additional flow paths, while gases flowing through said plurality of additional predetermined path can flush said one of said plurality of additional valve passages even when said valve seat associated with said one of said plurality of additional valve passages has been closed and flushing of said valve seat associated with one of said plurality of additional valve passages can be controlled by one of said valves associated with one of said additional flow passages.

10. Apparatus for handling gaseous streams comprising a unitary modular flow block including a first valve passage extending into said modular flow block, said first valve passage including a first valve entrance aperture and a first valve seat, a first valve including a reciprocating valve shaft mounted in said first valve passage for selectively opening and closing said first valve seat, a second valve passage extending into said modular flow block, said second valve passage including a second valve entrance aperture and a second valve seat, a second valve including a reciprocating valve shaft mounted in said second valve passage for selectively opening and closing said second valve seat, a first gas flow path extending through said modular flow block along a first predetermined path which includes a portion connecting said first valve seat with said second valve passage at a predetermined location between said second valve seat and said second valve entrance aperture and a second gas flow path extending through said modular flow block along a second predetermined path which includes said second valve seat, whereby closing of said first valve seat by said first valve closes said first gas flow path and closing of said second valve seat by said second valve closes said second gas flow path, while a gas flowing through said first gas flow path can flush said predetermined location in said second valve passage even when said second valve seat has been closed and flushing of said second valve seat can be controlled by said first valve.

11. The apparatus of claim 10, wherein said first and second valves comprise ultra-high vacuum valves.

12. The apparatus of claim 11, wherein said ultrahigh vacuum valves comprise bellows valves.

13. The apparatus of claim 10, including first valve mounting means for mounting said first valve on said modular flow block and second valve mounting means for mounting said second valve on said modular flow block.

14. The apparatus of claim 13, wherein said first and second valve mounting means comprise first and second valve flange members.

15. The apparatus of claim 14, wherein said first and second valve flange members comprise first and second annular rings adapted to mount said first and second valves on said modular flow block without the need to apply a rotational force to said first and second valve flange members.

16. The apparatus of claim 14, wherein said first and second valve flange members include a plurality of threaded apertures, and wherein said first and second valve entrance apertures include a plurality of corresponding threaded apertures, whereby said first and second valves can be mounted on said modular flow block by said first and second valve flange members, by appying a plurality of screw members through corresponding threaded apertures on said first and second valve flange members and said first and second valve entrance apertures.

17. The apparatus of claim 10, wherein said first and second valve entrance apertures are recessed in said modular flow block.

18. The apparatus of claim 17, including first valve mounting means for mounting said first valve in said recess of said first valve entrance aperture and second valve mounting means for mounting said second valve in said recess of said second valve entrance aperture.

19. The apparatus of claim 18, wherein said recesses of said first and second valve entrance apertures are annular, and when said first and second valve mounting means comprise first and second annular valve flange members.

20. The apparatus of claim 10, wherein said first and second gas flow paths include first and second gas ports, whereby gases may be injected into said first and second gas flow paths from locations outside of said modular flow block.

21. The apparatus of claim 20, wherein said first and second gas ports including gas port mounting means whereby conduits may be removably, hermetically sealed to said first and second gas flow paths.

22. The apparatus of claim 21, wherein said first and second gas ports are recessed within said modular flow block.

23. The apparatus of claim 22, wherein said first and second gas ports include sealing means, said sealing means comprising an annular projection for sealing mounting conduits thereon.

24. Apparatus for handling gaseous streams comprising a first unitary modular flow block including a first valve passage extending into said first modular flow block, said first valve passage including a first valve entrance aperture and a first valve seat whereby a first valve including a reciprocating valve shaft mounted in said first valve passage can selectively open and close said first valve seat, a second valve passage extending into said first modular flow block, said second valve passage including a second valve entrance aperture and a second valve seat, whereby a second valve including a reciprocating valve shaft mounted in said second valve passage can selectively open and close said second valve seat, a first gas flow path extending through said first modular flow block along a first predetermined path which includes a portion connecting said first valve seat with said second valve passage at a predetermined location between said second valve seat and said second valve entrance aperture, and a second gas flow path extending through said first modular flow block along a second predetermined path which includes said second valve seat, whereby closing of said first valve seat closes said first gas flow path and closing of said second valve seat closes said second gas flow path, while a gas flowing through said first gas flow path can flush said predetermined location in said second valve passage even when said second valve seat has been closed and flushing of said second valve seat can be controlled by said first valve, a second unitary modular flow block including a third valve passage extending into said second modular flow block, said third valve passage including a third valve entrance aperture and a third valve seat, whereby a third valve including a reciprocating valve shaft mounted in said third valve passage can selectively open and close said third valve seat, a fourth valve passage extending into said second modular flow block, said fourth valve passage including a fourth valve entrance aperture and a fourth valve seat, whereby a fourth valve including a reciprocating valve shaft mounted in said fourth valve passage can selectively open and close said second valve seat, a third gas flow path extending through said second modular flow block along a third predetermined path which includes a portion connecting said third valve seat with said fourth valve seat and said fourth valve entrance aperture, and a fourth gas flow path extending through said second modular flow block along a fourth predetermined path which includes said fourth valve seat, whereby closing of said third valve seat closes said third gas flow path and closing of said fourth valve seat closes said fourth gas flow path, while a gas flowing through said third gas flow path can flush said predetermined location in said fourth valve passage even when said fourth valve seat has been closed and flushing of said fourth valve seat can be controlled by said third valve.

25. The apparatus of claim 24, wherein said first and third gas flow paths include first and third gas ports, whereby gases may be injected into said first and third gas flow paths from locations outside of said first and second modular flow blocks, respectively.

26. The apparatus of claim 25, wherein said interconnecting means comprises first conduit means having a first end and a second end, second conduit means having a first end and a second end, first conduit mounting means for mounting said first end of said first conduit means on said first gas port, second conduit mounting means for mounting said first end of said second conduit means on said third gas port, junction box means including a pluraltiy of gas flow passages and first and second junction box gas ports, and first and second junction box mounting means for mounting said second ends of said first and second conduit means on said first and second junction box gas ports, respectively.

27. The apparatus of claim 25, wherein said interconnecting means comprises conduit means having a first end and a second end, and first and second conduit mounting means for mounting said first and second ends of said conduit means on said first and third gas ports, respectively.

28. The apparatus of claim 27, wherein said first and second conduit mounting means comprise first and second conduit flange members.

29. The apparatus of claim 28, wherein said first and second conduit flange members are adapted to mount said conduit means without the need to apply rotational force to said first and second conduit flange members, so as to removably, hermetically seal said conduit means onto said first and second modular flow blocks.

30. The apparatus of claim 28, wherein said first and second ends of said conduit means include first and second end faces adapted for mounting engagement with said first and third gas ports.

31. The apparatus of claim 30, wherein said first and second end faces include annular ridge means, and including first and second metallic gasket members interposed between said first and second end faces and said first and third gas ports, respectively.

32. The apparatus of claim 31, wherein said first and third gas ports include annular ridge means at a location corresponding to the locations of said annular ridge means of said first and second end faces, whereby said first and second metallic gasket members are sealingly engaged between said respective annular ridge means.

33. The apparatus of claim 24, wherein said first and third valves comprise ultra-high vacuum valves.

34. The apparatus of claim 33, wherein said ultrahigh vacuum valves comprise bellows valves.

35. The apparatus of claim 24, including first valve mounting means for mounting said first valve on said first modular flow block and third valve mounting means for mounting said third valve on said second modular flow block.

36. The apparatus of claim 35, wherein said first and third valve mounting means comprise first and third valve flange members.

37. The apparatus of claim 36, wherein said first and third valve flange members comprise first and third annular rings adapted to mount said first and third valves on said first and second modular flow blocks without the need to apply a rotational force to said first and third valve flange members.

38. The apparatus of claim 36, wherein said first and third valve flange members include a plurality of threaded apertures, and wherein said first and third valve entrance apertures include a plurality of corresponding threaded apertures, whereby said first and third valves can be mounted on said first and second modular flow blocks by said first and second valve flange members, by applying a plurality of screw members through corresponding threaded apertures on said first and third valve flange members and said first and third valve entrance apertures.

* * * * *

UNITED STATES PATENT AND TRADEMARK OFFICE
CERTIFICATE OF CORRECTION

PATENT NO. : 4,714,091

DATED : December 22, 1987

INVENTOR(S) : Wilfried R. Wagner

It is certified that error appears in the above-identified patent and that said Letters Patent is hereby corrected as shown below:

```
Column 3, line 14, "anothee" should read --another--.
Column 4, lines 45 and 46, "detailedll" should read
--detailed--.
Column 5, line 33, "4 178" should read --4 1/2--.
Column 5, line 39, "blcok" should read --block--.
Column 5, line 56, "interconnted" should read
--interconnected--.
Column 6, line 38, "systens" should read --systems--.
Column 6, line 51, "done" should read --one--.
Column 7, line 18, "24i a-c" should read --24a-c--.
Column 8, line 22, "38a-c'" should read --38a'-c'--.
Column 9, line 19, following "then" insert --into--.
Column 11, line 33, "176" should read --175--.
Column 12, line 45, "against" should read --again--.
Column 13, line 12, "in" should read --is--.
Column 15, line 10, "hemetically" should read
--hermetically--.
Column 17, line 41, "sealing" should read --sealingly--.
```

Signed and Sealed this

Fourteenth Day of June, 1988

Attest:

DONALD J. QUIGG

*Attesting Officer*  *Commissioner of Patents and Trademarks*